(12) United States Patent
Hörmann

(10) Patent No.: US 7,883,048 B2
(45) Date of Patent: Feb. 8, 2011

(54) METHOD FOR COMBINING HOLLOW FIBRES INTO A BUNDLE AND HOLLOW FIBRE BUNDLE PRODUCED BY SAID METHOD

(75) Inventor: Jörn Hörmann, Heusweiler (DE)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 162 days.

(21) Appl. No.: 12/310,442

(22) PCT Filed: Aug. 16, 2007

(86) PCT No.: PCT/EP2007/007264

§ 371 (c)(1),
(2), (4) Date: Feb. 25, 2009

(87) PCT Pub. No.: WO2008/025459

PCT Pub. Date: Mar. 6, 2008

(65) Prior Publication Data

US 2009/0321348 A1    Dec. 31, 2009

(30) Foreign Application Priority Data

Aug. 28, 2006    (DE) .................. 10 2006 040 214

(51) Int. Cl.
*B31F 1/00*    (2006.01)
*B65H 54/28*    (2006.01)
*B01D 63/00*    (2006.01)

(52) U.S. Cl. ............ 242/480.3; 242/899; 242/615.4; 210/500.23; 210/321.8; 210/496; 264/271.1; 156/202; 156/242; 156/73.5; 156/185; 428/36.92

(58) Field of Classification Search ............. 210/321.8, 210/321.89, 321.9, 321.88, 500.2, 496; 156/202, 156/242, 73.5, 90, 497, 185; 242/480.3, 242/899, 615.4; 428/36.92
See application file for complete search history.

(56) References Cited

U.S. PATENT DOCUMENTS

| 4,267,630 | A | * | 5/1981 | Sebring ..................... 29/411 |
| 4,276,687 | A |   | 7/1981 | Schnell |
| 4,343,668 | A | * | 8/1982 | Francisoud et al. ......... 156/172 |
| 4,431,005 | A | * | 2/1984 | McCormick ................. 600/433 |
| 4,666,469 | A | * | 5/1987 | Krueger et al. ................ 95/54 |
| 4,837,972 | A | * | 6/1989 | Reed ............................. 47/67 |
| 5,554,283 | A | * | 9/1996 | Brinda et al. ............ 210/321.8 |
| 5,882,752 | A | * | 3/1999 | Yoneda .................... 428/36.92 |
| 6,708,465 | B1 | * | 3/2004 | Gustafsson .................. 53/463 |
| 6,814,780 | B2 | * | 11/2004 | Bikson et al. .................. 95/51 |
| 6,951,611 | B2 | * | 10/2005 | Dannenmaier et al. . 210/321.89 |
| 7,459,084 | B2 | * | 12/2008 | Baig et al. .................. 210/640 |
| 2009/0321348 | A1 | * | 12/2009 | Hormann .................... 210/496 |

FOREIGN PATENT DOCUMENTS

| DE | 31 02 331 A1 | 9/1982 |
| DE | 36 11 623 A1 | 10/1986 |
| DE | 198 06 293 A1 | 8/1999 |
| EP | 0 662 387 A2 | 7/1995 |

* cited by examiner

*Primary Examiner*—Ana M Fortuna
(74) *Attorney, Agent, or Firm*—Jacobson Holman PLLC

(57) ABSTRACT

The invention relates to a method for the combining of hollow fibers to form a bundle, wherein after a batch-wise taking of continuously manufactured hollow fibers onto a reel apparatus the hollow fibers placed together to form bundles are wound around by means of a winding film and are subsequently welded. Such hollow fibers represent intermediate products in the manufacture of dialyzers for use in hemodialysis.

9 Claims, 1 Drawing Sheet

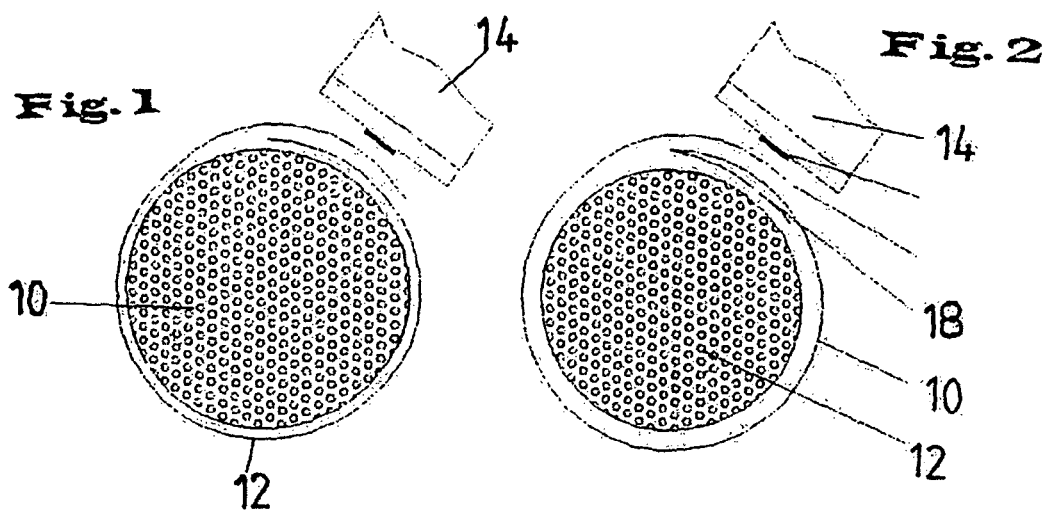
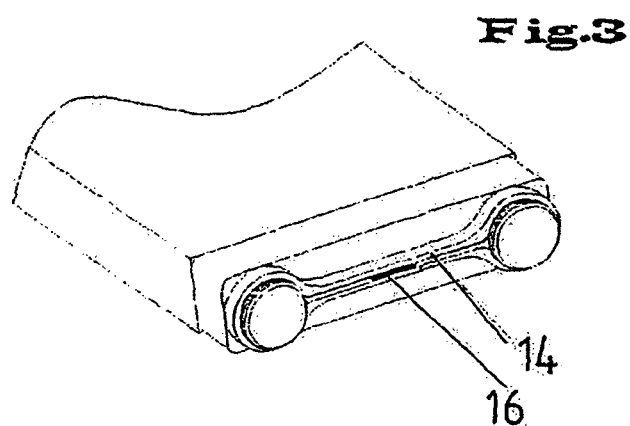
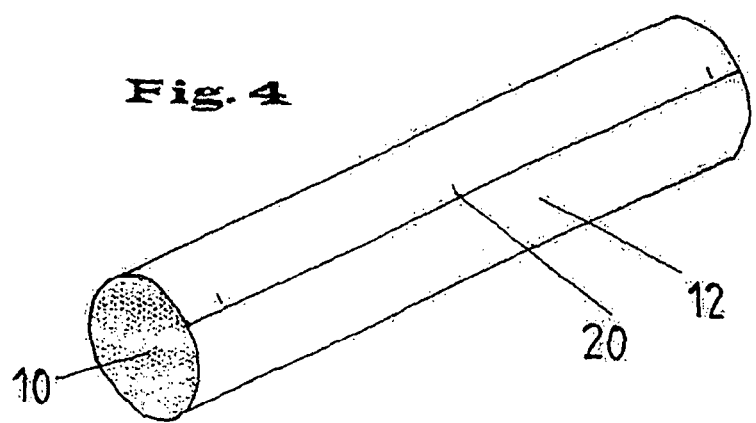

METHOD FOR COMBINING HOLLOW FIBRES INTO A BUNDLE AND HOLLOW FIBRE BUNDLE PRODUCED BY SAID METHOD

This is a national stage of PCT/EP2007/007264 filed Aug. 16, 2007 and published in German, which has a priority of German no. 10 2006 040 214.6 filed Aug. 28, 2006, hereby incorporated by reference.

The invention relates to a method of combining fibers or also threads, in particular temperature-sensitive hollow fibers to form a bundle.

Hollow fibers can be used as a membrane, that is, as a hollow fiber membrane, for the carrying out of membrane separation methods. Such hollow fibers are therefore also termed membrane fibers. Hollow fiber membranes are in particular used in medical engineering. Various other application areas are, however, also known.

Hollow fiber bundles are used in medical engineering e.g. for the manufacture of filters for extracorporeal blood treatment procedures, e.g. for hemodialysis, hemofiltration and hemodiafiltration. In accordance with the prior art, hollow fiber membranes for dialysis are manufactured by continuously operating hollow fiber spinning machines. The hollow fibers continuously exiting the hollow fiber spinning machine are usually wound batch-wise e.g. onto slowly rotating reel wheels. Other reel apparatus for the taking up of hollow fibers are, however, also known, e.g. with stationary winding mandrels. The reel wheels have winding mandrels distributed uniformly over the periphery and the hollow fibers lie on them. The hollow fibers are thereby freely tensioned between the winding mandrels. The spacings between the winding mandrels are selected such that a hollow fiber bundle is created between two respective winding mandrels. These hollow fiber bundles have a thin winding film of plastic wound round them by hand so that the hollow fiber bundle is given a circular cross-section having a previously determined defined diameter. The winding film is placed around the hollow fiber bundle such that it overlaps. The winding film is then manually fixed with adhesive strips in the overlapping region. As soon as the hollow fiber bundle has been fixed in this manner, it is cut off at the desired length using a cutting apparatus by hand again. Finally, the hollow fiber bundle is introduced into a cylindrical filter cartridge. After the introduction of the hollow fiber bundle, the winding film is pulled off the hollow fiber bundle and disposed of. Manufacturing methods of this type are described, for example, in U.S. Pat. No. 4,276,687.

It is the object of the present invention to automate the combining of the hollow fibers to form a bundle by means of a winding film. It is a further object of the present invention to prevent damage to the sensitive hollow fibers during the automatic fixation of the winding film.

This object is solved in accordance with the invention by a method in accordance with claim 1. This method consists of the following steps:
  batch-wise winding of continuously manufactured hollow fibers on reel apparatus;
  winding around of the respective hollow fibers tensioned between two winding mandrels of the reel apparatus and combined in the manner of a bundle with a winding film such that the edge of the winding film disposed directly on the hollow fiber bundle on the winding round is folded over inwardly toward the hollow fiber bundle; and
  welding of the overlapping edge regions of the winding film.

In accordance with the invention, the fixing by adhesive strips is replaced by an automatic welding procedure, preferably an automatic heat impulse welding procedure.

To prevent any thermal damage to the extremely sensitive hollow fibers in the welding region, that is in the overlapping region of the film, in accordance with the invention, the edge of the winding film is folded over toward the hollow fiber bundle which is disposed directly on the hollow fiber bundle. The melting of the inner side of the film is precluded with certainty by this simple means without any real added costs even if the welding tool is not parameterized fully correctly, that is was not set correctly.

Preferred aspects of the invention result from the subordinate claims dependent on the main claim.

Accordingly, the winding film can be folded at its one edge region in an automating of the process via an apparatus which is incorporated before the drawing of the film into the winding apparatus. It is, however, also possible to make the winding film available with an already pre-folded edge.

The welding of the winding film can take place by means of generally known plastic welding procedures, preferably by heat impulse welding tools. The welding time can lie in the range of <10 s in dependence on the selected film materials and film thicknesses can preferably amount to approx. 0.3 to 0.5 s in heat impulse welding. However, other plastic welding procedures can also be used such as e.g. permanently heated tools or laser welding methods.

The overlapping edge regions of the film can preferably only be welded to one another at spots spaced apart from one another. It is, however, also possible to weld the overlapping edge regions of the film to one another by means of a continuous weld seam or by means of a plurality of continuous weld seam sections.

A hollow fiber bundle which is manufactured in accordance with the aforesaid procedure also forms part of the invention. In accordance with the invention, in an intermediate production step before the introduction into a housing which can, for example, be a dialyzer housing, a winding film is wound around the hollow fiber bundle which is folded over inwardly toward the hollow fibers at its edge region lying on the hollow fiber bundle.

Further features, details and advantages of the invention will be explained in more detail with reference to an embodiment shown in the drawing. There are shown:

FIG. 1: a schematic representation of a method step in the manufacture of a hollow fiber bundle;

FIG. 2: a representation in accordance with FIG. 1 in accordance with the method in accordance with the invention;

FIG. 3: a schematic representation of a welding tool such as can be used in the method in accordance with the invention; and FIG. 4: a perspective representation of a hollow fiber bundle.

In FIG. 1, a section is shown through a reeled membrane fiber strand 10 around which a winding film 12 is wound. A compression of the bundle created by the winding to a specific packing density takes place on the winding. Furthermore, the bundle is given a defined bundle diameter so that the bundle can be shaped into a filter housing, e.g. into a dialyzer housing, not shown in any more detail here. The winding film 12 serves as an aid for this. The winding film is removed again after the introduction of the bundle into the dialyzer housing. After the winding of the hollow fiber bundle, the winding film must be fixed. This is done in accordance with the present invention via a welding tool 14 which is shown, for example, in FIG. 3. It is here a heat impulse welding tool in which an electrical conductor is heated. This heating takes place within a very short time. The welding time lies in the range from approx. 0.3 to 0.5 seconds. The welding region is shown with 16 in FIG. 3.

The difficulty in the welding of thin films using a heat impulse welding tool is that the welding process is correctly parameterized. If the welding process was not set correctly or if deviations occur in the conditions forming the basis for the setting, different problems can occur in a welding procedure such as is shown, for example, in FIG. 1. The overlap region of the film can thus, for example, not be firmly welded. Furthermore, if the weld impulse is too strong, the membrane fibers can be welded as well and adhere to the winding film so that they are torn off on the shaping of the bundle into the dialyzer housing. Furthermore, the membrane fibers can be thermally damaged so that a flow is no longer possible. Finally, the membrane threads can be melted and solidify in an uncontrolled manner. So-called weld noses can also arise at the inner side of the film due to the melting of the film and the fibers can catch on them on the pulling out of the winding film or can form loops. These problems can, however, also arise by the winding process, for example, on a change of the cycle time.

In the method sequence such as is shown in FIG. 2, these problems are prevented by a very simple measure. Here, namely, a side of the winding film is folded at the edge so that a folded region 18 is formed here. This folded region 18 forms a protective layer between the hollow fibers 10 and the film 12 to be welded.

The following advantages thereby result. The winding film can be securely welded. The parameterization of the welding apparatus is not critical. In the method shown in FIG. 1, 10° temperature difference can influence the weld seam quality, that is the fibers could be damaged or the weld seam could not have the required and desired strength.

With the winding film in accordance with the invention with the folded region 18, a temperature increase of the welding apparatus 14 of, for example, 50° C. would also not have any influence on the result. The introduction of energy is not sufficient here to weld the additional layer. The fibers thus remain undamaged.

No weld noses arise either due to the folded region 18.

Since the introduction of energy no longer has to be precisely metered, welding can take place with higher temperatures in a shorter time. However, this means that the cycle time can be considerably minimized.

If now the weld seam extends over the film edge, two film layers protect the hollow fiber 10 instead of only one layer. This situation can, for example, occur due to incorrect winding.

A hollow fiber bundle is shown in FIG. 4 in which the hollow fibers are wound around by the winding film 12. The latter is welded with three spaced apart weld seams 20 in its edge region.

The invention claimed is:

1. A method of combining hollow fibers to form a bundle consisting of the following steps:
   batch-wise taking up of continuously manufactured hollow fibers on slowly rotating reel apparatus;
   winding around of the respective hollow fibers tensioned between two winding mandrels of the reel apparatus and combined in the manner of a bundle with a winding film such that the edge of the winding film disposed directly on the hollow fiber bundle on the winding round is folded over inwardly toward the hollow fiber bundle; and
   welding of the overlapping edge regions of the winding film.

2. A method in accordance with claim 1, wherein the winding film is folded at its one edge region via an apparatus which is incorporated prior to the drawing of the film into the winding apparatus.

3. A method in accordance with claim 1, wherein the winding film is made available with an already pre-folded edge region.

4. A method in accordance with claim 3, wherein the weld time amounts to less than 10 s.

5. A method in accordance with claim 1, wherein the welding of the winding film takes place via heat impulse welding tools.

6. A method in accordance with claim 5, wherein the weld time amounts to approximately 0.3 to 0.5 s.

7. A method in accordance with claim 1, wherein the overlapping edge regions of the film are only welded to one another at spots spaced apart from one another.

8. A method in accordance with claim 1, wherein the overlapping edge regions of the film are welded to one another by a continuous weld seam or a by a plurality of continuous weld seam sections.

9. A hollow fiber bundle manufactured in a method in accordance with claim 1, wherein it is enveloped by a winding film in an intermediate production step before the introduction into a housing, for example a dialyzer housing, said winding film being folded over inwardly toward the hollow fibers at its edge region lying on the hollow fiber bundle.

\* \* \* \* \*